(12) United States Patent
Chang et al.

(10) Patent No.: US 7,466,860 B2
(45) Date of Patent: Dec. 16, 2008

(54) METHOD AND APPARATUS FOR CLASSIFYING AN OBJECT

(75) Inventors: Peng Chang, West Windsor, NJ (US); Theodore Armand Camus, Marlton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 11/213,660

(22) Filed: Aug. 26, 2005

(65) Prior Publication Data

US 2007/0237398 A1    Oct. 11, 2007

Related U.S. Application Data

(60) Provisional application No. 60/605,339, filed on Aug. 27, 2004.

(51) Int. Cl.
*G06K 9/62* (2006.01)
(52) U.S. Cl. .................. 382/224; 382/103; 382/159
(58) Field of Classification Search .................. 382/103, 382/154, 156, 159, 224
See application file for complete search history.

(56) References Cited

U.S. PATENT DOCUMENTS

| | | | | |
|---|---|---|---|---|
| 5,640,468 A | * | 6/1997 | Hsu | 382/190 |
| 6,151,424 A | * | 11/2000 | Hsu | 382/294 |
| 6,404,920 B1 | * | 6/2002 | Hsu | 382/190 |
| 6,493,620 B2 | * | 12/2002 | Zhang | 701/45 |
| 6,597,800 B1 | | 7/2003 | Murray et al. | |
| 6,754,389 B1 | * | 6/2004 | Dimitrova et al. | 382/224 |
| 7,089,226 B1 | * | 8/2006 | Dumais et al. | 707/3 |
| 7,103,213 B2 | * | 9/2006 | Hirvonen et al. | 382/154 |
| 2003/0194151 A1 | * | 10/2003 | Wang et al. | 382/300 |
| 2005/0058350 A1 | * | 3/2005 | Dugan et al. | 382/224 |
| 2005/0270286 A1 | * | 12/2005 | Hirvonen et al. | 345/422 |
| 2007/0223044 A1 | * | 9/2007 | Bailey et al. | 358/3.06 |
| 2007/0237398 A1 | * | 10/2007 | Chang et al. | 382/224 |

FOREIGN PATENT DOCUMENTS

EP    1388804 A2  *  2/2004

* cited by examiner

*Primary Examiner*—Gregory M Desire
(74) *Attorney, Agent, or Firm*—Lowenstein Sandler PC (57) ABSTRACT

A method and apparatus for classifying an object in an image is disclosed. A plurality of sub-classifiers is provided. An object is classified using input from each of the plurality of sub-classifiers.

33 Claims, 8 Drawing Sheets

| 3D raw | 3D score1 | 3D score2 | Edge | Contour |
|---|---|---|---|---|
| 29.5% | 37.5% | 40.5% | 10.5 % | 46 % |

FIG. 6

| 3D raw | 3D score1 | 3D score2 | Edge | Contour |
|---|---|---|---|---|
| 29.5% | 37.5% | 40.5% | 10.5 % | 46 % |

METHOD AND APPARATUS FOR CLASSIFYING AN OBJECT

CROSS-REFERENCE TO RELATED APPLICATIONS

This application claims the benefit of U.S. provisional patent application No. 60/605,339, filed Aug. 27, 2004, which is herein incorporated by reference.

BACKGROUND OF THE INVENTION

1. Field of the Invention

The present invention relates to artificial or computer vision systems, e.g. vehicular vision systems. In particular, this invention relates to a method and apparatus for detecting automobiles and pedestrians in a manner that facilitates collision avoidance.

2. Description of the Related Art

Collision avoidance systems utilize a sensor system for detecting objects in front of an automobile or other form of vehicle or platform. In general, a platform can be any of a wide range of bases, including a boat, a plane, an elevator, or even a stationary dock or floor. The sensor system may include radar, an infrared sensor, or another detector. In any event the sensor system generates a rudimentary image of the scene in front of the vehicle. By processing that imagery, objects can be detected. Collision avoidance systems generally identify when an object is in front of a vehicle, but usually do not classify the object into distinct and relevant categories.

Therefore, there is a need in the art for a method and apparatus that provides for differentiating detected objects.

SUMMARY OF THE INVENTION

The present invention describes a method and apparatus for classifying an object in an image. In one embodiment, a plurality of sub-classifiers is provided. An object is classified using input from each of the plurality of sub-classifiers.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The present invention discloses in one embodiment a method and apparatus for classifying an object in a region of interest based on one or more features of the object. Detection and classification of pedestrians, vehicles, and other objects are important, e.g., for automotive safety devices, since these devices may deploy in a particular fashion only if a target of the particular type (i.e., pedestrian or car) is about to be impacted. In particular, measures employed to mitigate the injury to a pedestrian may be very different from those employed to mitigate damage and injury from a vehicle-to-vehicle collision.

The term image-based classifier is defined as a means of identifying something (typically an object or other element of an image, such as a shadow) as a member of at least one class, using properties derived from a single image from a camera. The term depth-based classifier is defined as a means of identifying something as a member of at least one class, using properties derived from measurements of depth or distance, relative to a sensor or reference point or points. The term contour-based classifier is defined as a means of identifying something as a member of at least one class, using properties derived from significant intensity transitions of similar quality in an image, along continuous long segments or curves. An edge-based classifier is defined as a means of identifying something as a member of at least one class, using properties derived from significant intensity transitions of similar quality in an image, along short, straight, and continuous segments.

Figure 1:
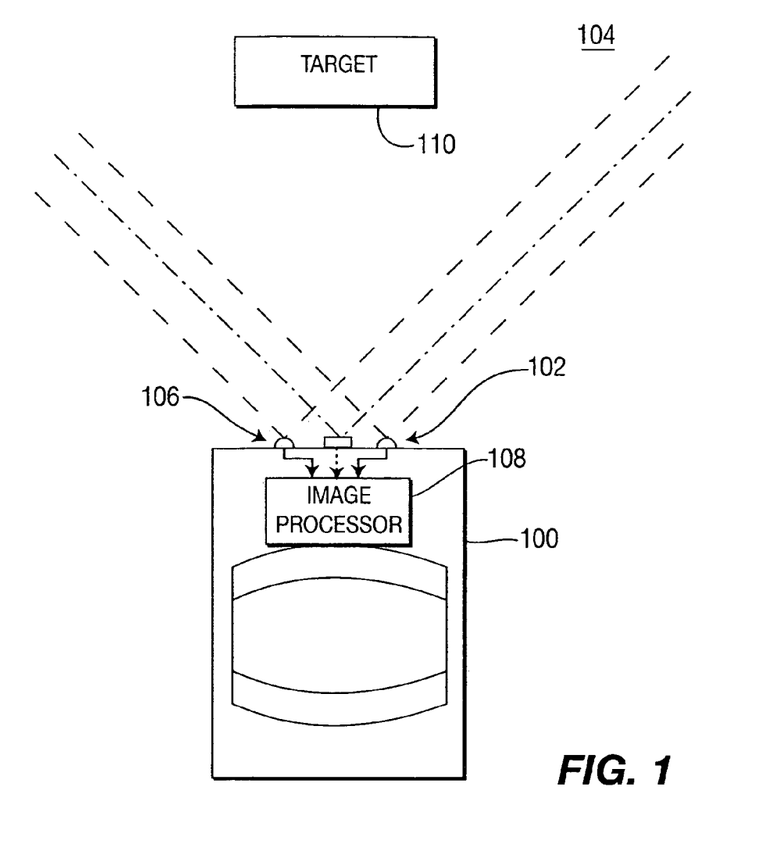
FIG. 1 depicts one embodiment of a schematic view of a vehicle utilizing the present invention.

FIG. 1 depicts a schematic diagram of a host, e.g., vehicle 100 having a target differentiation system 102 that differentiates a pedestrian (or pedestrians) 110 within a scene 104 that is proximate the vehicle 100. It should be understood that target differentiation system 102 is operable to detect pedestrians, automobiles, or other objects. While in the illustrated embodiment scene 104 is in front of vehicle 100, other object detection systems may image scenes that are behind or to the side of vehicle 100. Furthermore, target differentiation system 102 need not be related to a vehicle, but can be used with any type of platform, such as a boat, a plane, an elevator, or even stationary streets, docks, or floors. Target differentiation system 102 comprises a sensor array 106 that is coupled to an image processor 108. The sensors within the sensor array 106 have a field of view that includes one or more targets.

The field of view in a practical object detection system 102 may be ±12 meters horizontally in front of the vehicle 100 (e.g., approximately 3 traffic lanes), with a ±3 meter vertical area, and have a view depth of approximately 5-40 meters. (Other fields of view and ranges are possible, depending on camera optics and the particular application.) Therefore, it should be understood that the present invention can be used in a pedestrian detection system or as part of a collision avoidance system.

Figure 2:
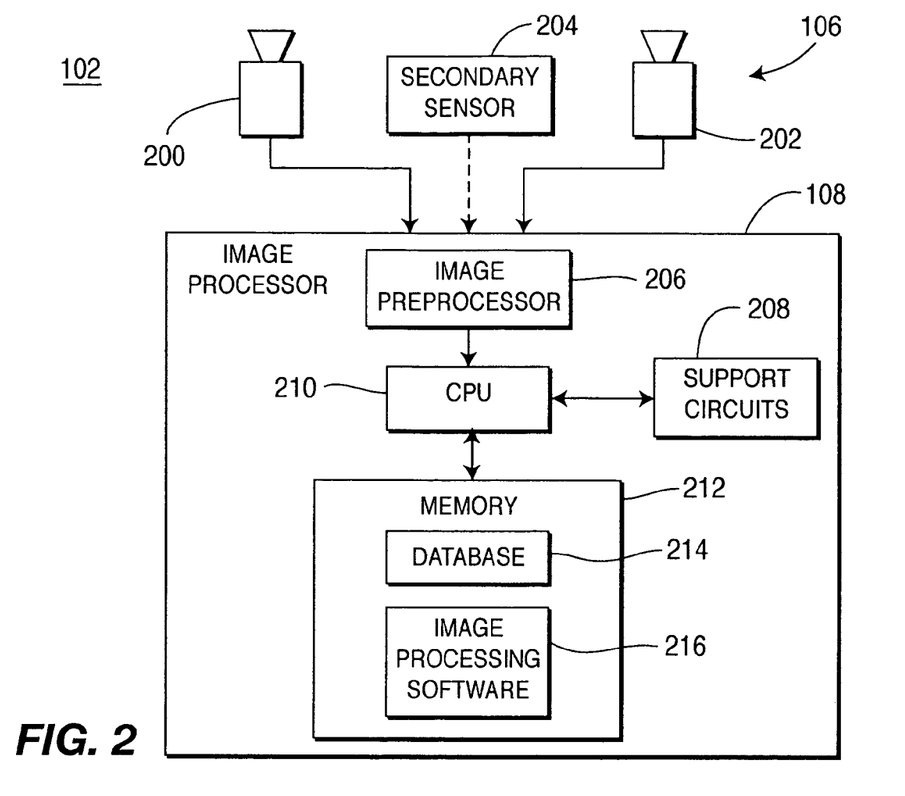
FIG. 2 depicts a block diagram of a vehicular vision system in accordance with one embodiment of the present invention.

FIG. 2 depicts a block diagram of hardware used to implement the target differentiation system 102. The sensor array 106 comprises, for example, a pair of cameras 200 and 202. In some applications an optional secondary sensor 204 can be included. The secondary sensor 204 may be radar, a light detection and ranging (LIDAR) sensor, an infrared range finder, a sound navigation and ranging (SONAR) senor, and the like. The cameras 200 and 202 generally operate in the visible wavelengths, but may be augmented with infrared sensors, or the cameras may themselves operate in the infrared range. The cameras have a known, fixed relation to one another such that they can produce a stereo image of the scene 104. Therefore, the cameras 200 and 202 will sometimes be referred to herein as stereo cameras.

Still referring to FIG. 2, the image processor 108 comprises an image preprocessor 206, a central processing unit (CPU) 210, support circuits 208, and memory 212. The image preprocessor 206 generally comprises circuitry for capturing, digitizing and processing the imagery from the sensor array 106. The image preprocessor may be a single chip video processor such as the processor manufactured under the model Acadia I™ by Pyramid Vision Technologies of Princeton, N.J.

The processed images from the image preprocessor 206 are coupled to the CPU 210. The CPU 210 may comprise any one of a number of presently available high speed microcontrollers or microprocessors. CPU 210 is supported by support circuits 208 that are generally well known in the art. These circuits include cache, power supplies, clock circuits, input-output circuitry, and the like. Memory 212 is also coupled to CPU 210. Memory 212 stores certain software routines that are retrieved from a storage medium, e.g., an optical disk, and the like, and that are executed by CPU 210 to facilitate operation of the present invention. Memory 212 also stores certain databases 214 of information that are used by the present invention, and image processing software 216 that is used to process the imagery from the sensor array 106. Although the present invention is described in the context of a series of method steps, the method may be performed in hardware, software, or some combination of hardware and software (e.g., an ASIC). Additionally, the methods as disclosed can be stored on a computer readable medium.

Figure 3:
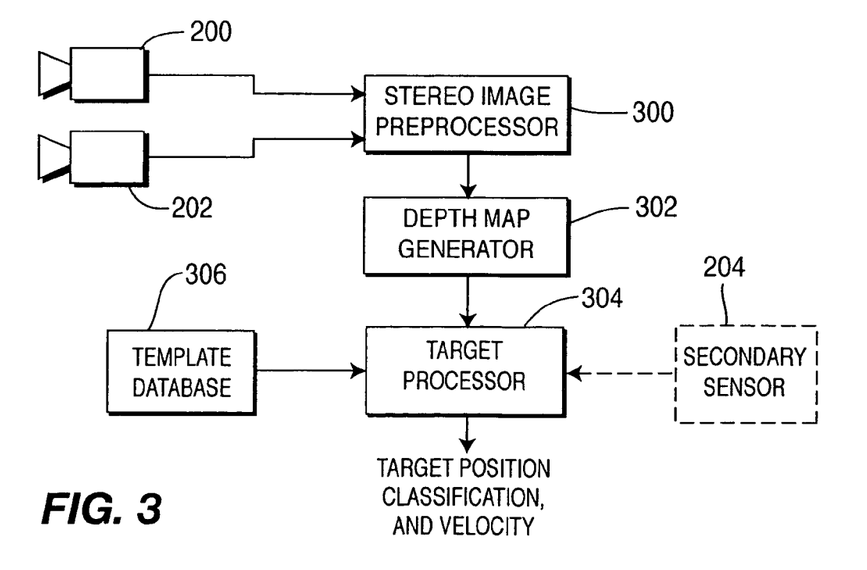
FIG. 3 depicts a block diagram of functional modules of the vision system of FIG. 2 in accordance with one embodiment of the present invention.

FIG. 3 is a functional block diagram of modules that are used to implement the present invention. The stereo cameras 200 and 202 provide stereo imagery to a stereo image preprocessor 300. The stereo image preprocessor is coupled to a depth map generator 302 which is coupled to a target processor 304. Depth map generator 302 may be utilized to define a region of interest (ROI), i.e., an area of the image that potentially contains a target 110. In some applications the depth map generator 302 is not used. In applications where depth map generator 302 is not used, ROIs would be determined using image-based methods. The following will describe the functional block diagrams under the assumption that a depth map generator 302 is used. The target processor 304 receives information from a target template database 306 and from the optional secondary sensor 204. The stereo image preprocessor 300 calibrates the stereo cameras, captures and digitizes imagery, warps the images into alignment, performs pyramid wavelet decomposition, and performs stereo matching, which is generally well known in the art, to create disparity images at different resolutions.

For both hardware and practical reasons, creating disparity images having different resolutions is beneficial when detecting objects. Calibration provides for a reference point and direction from which all distances and angles are determined. Each of the disparity images contains the point-wise motion from the left image to the right image and each corresponds to a different image resolution. The greater the computed disparity of an imaged object, the closer the object is to the sensor array.

The depth map generator 302 processes the multi-resolution disparity images into a two-dimensional depth image.

The depth image (also referred to as a depth map) contains image points or pixels in a two dimensional array, where each point represents the depth (z coordinate in the camera coordinate system) of a point within the scene. The depth image is then processed by the target processor 304 wherein templates (models) of typical objects encountered by the vision system are compared to the information within the depth image. As described below, the template database 306 comprises templates of objects (e.g., automobiles, pedestrians) located at various locations and poses with respect to the sensor array.

An exhaustive search of the template database may be performed to identify the set of templates that most closely explain the present depth image. The secondary sensor 204 may provide additional information regarding the position of the object relative to the vehicle, velocity of the object, size or angular width of the object, etc., such that the target template search process can be limited to templates of objects at about the known position relative to the vehicle. If the secondary sensor is a radar sensor, the sensor can, for example, provide an estimate of both object location and velocity. The target processor 304 produces a target list that is then used to identify target size and classification estimates that enable target tracking and the identification of each target's position, classification and velocity within the scene. That information may then be used to avoid collisions with each target or perform pre-crash alterations to the vehicle to mitigate or eliminate damage (e.g., lower or raise the vehicle, deploy air bags, and the like).

Figure 4:
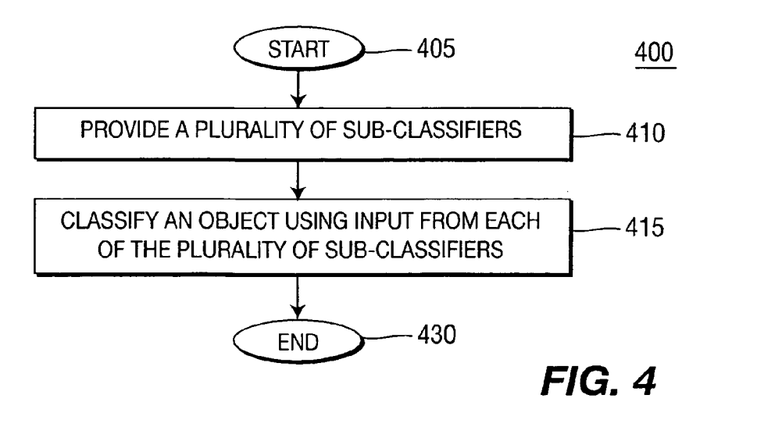
FIG. 4 illustrates a flow diagram in accordance with a method of the present invention.

FIG. 4 depicts a flow diagram of a method 400 for classifying an object in an image. The method 400 begins at step 405 and proceeds to step 410. In step 410, a plurality of sub-classifiers is provided. Several sub-classifiers may be used as input to a hybrid classifier. The sub-classifiers used as input to the hybrid classifier may comprise two categories: depth-based classifiers and image-based classifiers. It should be noted that the particular set of sub-classifiers used may be depth-based classifiers, image-based classifiers, or a combination of depth-based classifiers and image-based classifiers. It should also be noted that any image-based or depth-based sub-classifier may be utilized with the present invention, however, in the interests of clarity only a portion of the many possible sub-classifiers will be described.

In the first category, depth-based classifiers, the first two sub-classifiers are the original vehicle model and pedestrian model three-dimensional block template matching scores, labeled as '3d-car' and '3d-ped', respectively. Two more additional measures are derived from the block template matching values. The first, labeled 'Score1', measures the peakness of a pedestrian model match and is defined as the ratio of the pedestrian 3d score and the sum of its two adjacent pedestrian 3d scores. The second, labeled 'Score2', is the ratio of pedestrian and car 3d model scores. Finally, an eccentricity test, labeled '3d-cue', which applies only to pedestrians, measures the flatness of the target in the depth map, under the assumption that pedestrians tend to have very small depth variation as compared to vehicles.

In the second category, image-based classifiers, the first is a contour-based classifier. The second is an edge-based classifier.

Figure 5:
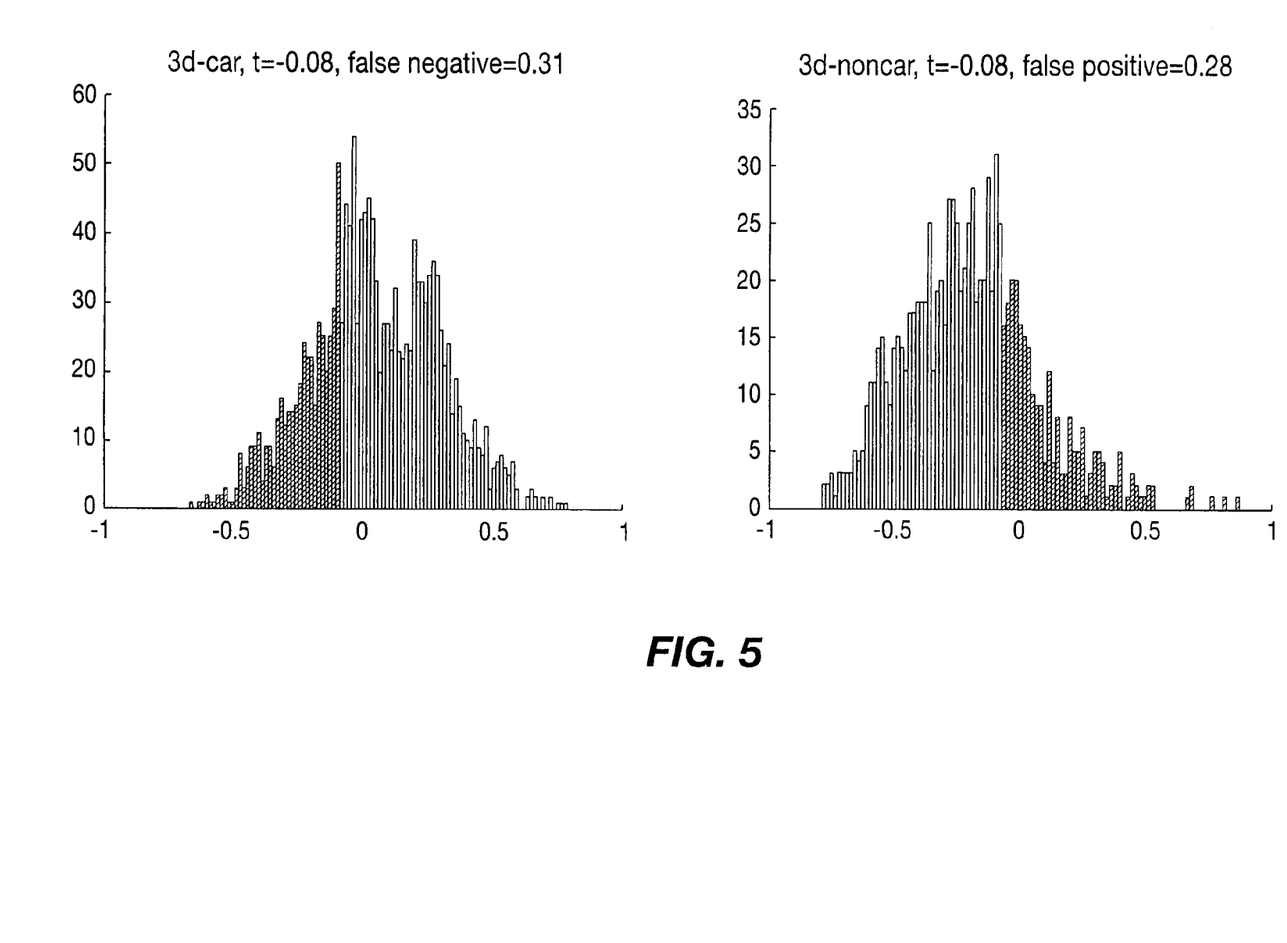
FIG. 5 illustrates the result of one exemplary classifier.

FIG. 5 shows the histograms of classifier scores on one particular classifier, 3d-car, running on either the car-only data or the pedestrian-only data, respectively. In each case, an optimal threshold is set for that classifier. The left histogram in FIG. 5 shows cases of 3d-car classifier operating on the same-class (i.e., car-only) data, with cases misclassified as non-cars, i.e. false negatives, shown using light shading and correct classifications, as cars, are shown using dark shading.

Similarly, the right histogram in FIG. 5 shows cases of the 3d-car classifier operating on the different-class (i.e., pedestrian-only) data, with cases misclassified as cars, i.e. false positives, shown using light shading and correct classifications, as non-cars, shown using dark shading. This optimal threshold for each classifier is typically set to minimize the sum of the false-negative and false-positive percentages for that classifier. In this example, a threshold of −0.08 yields a sum of false-negatives and false-positives of 0.59. The sum of the false negative and the false-positive percentages should be less than 1.0 in order for the classifier to be considered better than chance. It should be noted, however, that a different policy could be used if the false-negative and false-positive conditions are not weighted equally, which could yield a different threshold. This process of setting optimal thresholds applies independently to each individual classier.

Figure 6:
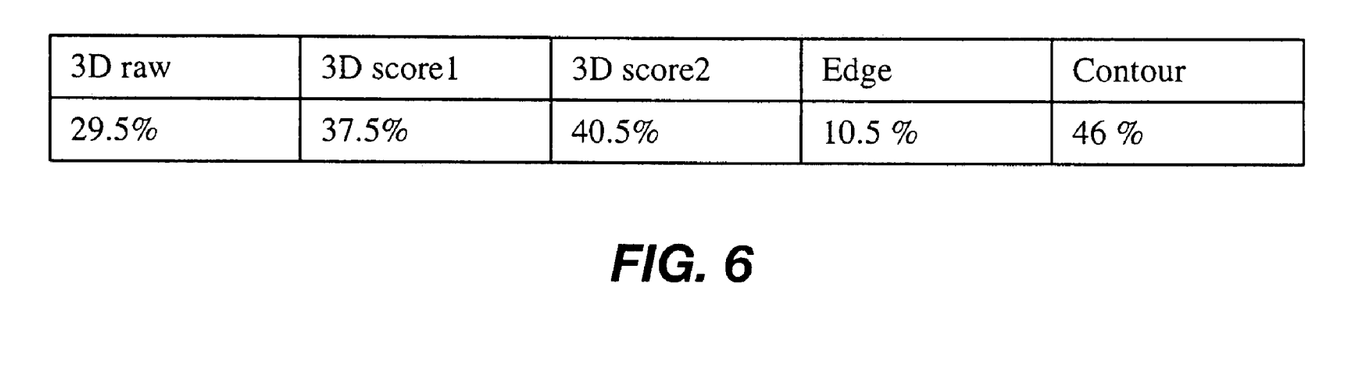
FIG. 6 illustrates the error rate of each car sub-classifier.
Figure 7:
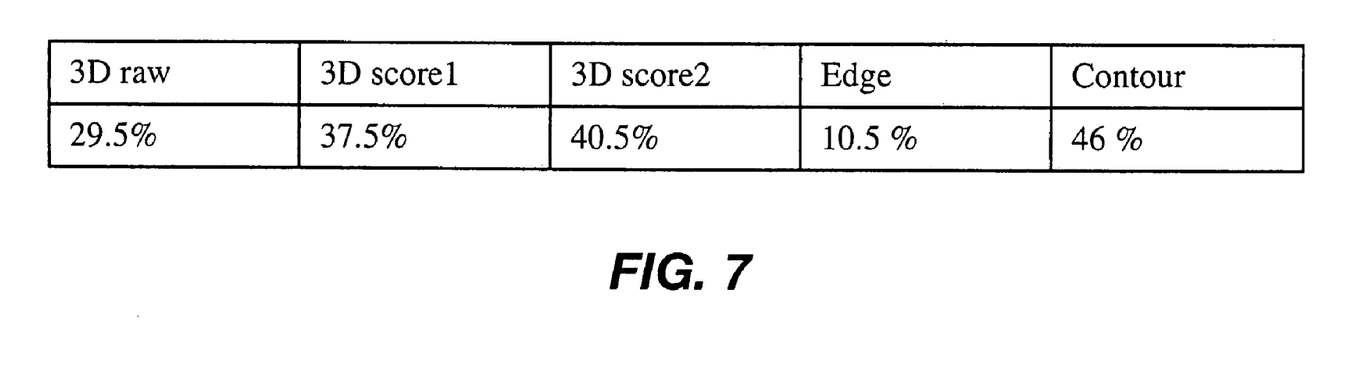
FIG. 7 illustrates the error rate of each pedestrian sub-classifier.

Individually, when run over a large data set, the classifiers may not be very strong. One measure is the sum of the False-Negative and False-Positive rates. If this sum is close to 1.0, then the individual classifier is little better than a random guess. The error rates of each individual classifier are shown in FIGS. 6 and 7. FIG. 6 illustrates the error rate of each car sub-classifier consisting of only a single feature. FIG. 7 illustrates the error rate of each pedestrian sub-classifier consisting of only a single feature.

In step 415, an object is classified using input from each of the plurality of sub-classifiers. In one embodiment, the object is classified using a hybrid classifier. There are several methods available for combining weak classifiers, e.g., sub-classifiers, into a strong one. Here a Bayesian approach is adopted.

Suppose $\omega_k$ is a Boolean variable indicating whether a detected object belongs to the $k_{th}$ predefined category. Variable $\omega_k$ may be defined as:

$$\omega_k = \begin{cases} 1 & \text{if object belongs to category } k \\ 0 & \text{otherwise} \end{cases}$$

Hypotheses $H_0:\omega_k=1$, and $H_1:\omega_k=0$, are also defined. Given N features $x_i, i=1 \ldots N$, a likelihood ratio, e.g. a log likelihood ratio, may be used to decide which hypothesis to select. Define log likelihood ratio for category k as:

$$\begin{aligned} f_k &= \ln \frac{p(\omega_k = 1 \mid x_i, i = 1 \ldots N)}{p(\omega_k = 0 \mid x_i, i = 1 \ldots N)} \\ &= \ln p(\omega_k = 1 \mid x_i, i = 1 \ldots N) - \ln p(\omega_k = 0 \mid x_i, i = 1 \ldots N) \\ &= \ln p(x_i, i = 1 \ldots N \mid \omega_k = 1) - \ln p(x_i, i = 1 \ldots N \mid \omega_k = 0) + \\ &\quad \ln p(\omega_k = 1) - \ln p(\omega_k = 0) \\ &= \sum_i (p(x_i \mid \omega_k = 1) - p(x_i \mid \omega_k = 0)) + \ln p(\omega_k = 1) - \\ &\quad \ln p(\omega_k = 0) \end{aligned}$$

The decision, e.g., a classification decision by the hybrid classifier, can be made according to:

$$\begin{cases} H_0 & \text{if } f_k > 0 \\ H_1 & \text{otherwise} \end{cases}$$

In one embodiment, $x_i$ is chosen to be binary features, as a result of thresholding the corresponding input feature. The optimal threshold for each feature can be learned from a training set, by minimizing certain error metric. The probabilities $p(x_i|\omega_k=1)$ and $p(x_i|\omega_k=0)$ can also be learned from the training set.

Figure 8A:
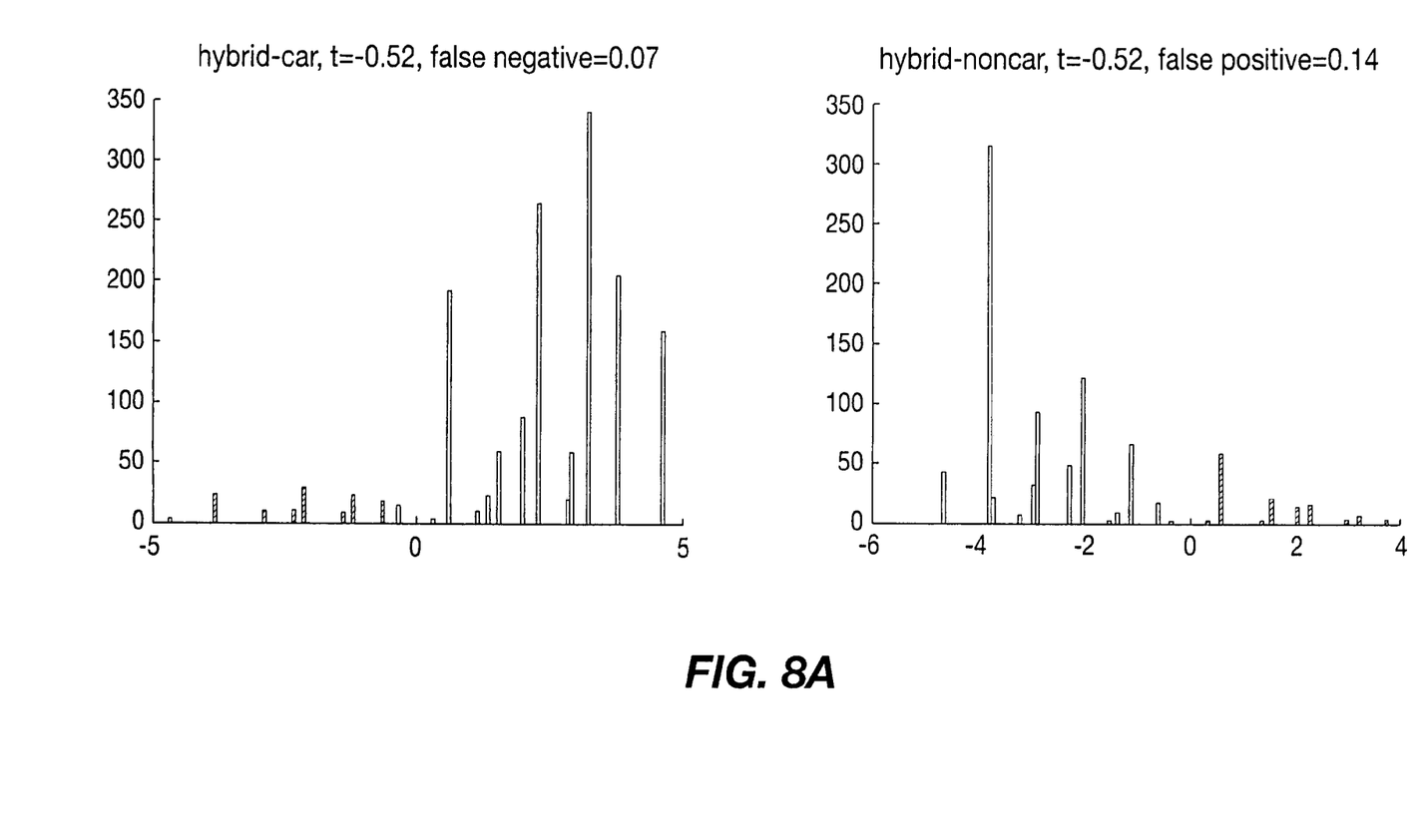
FIG. 8A-B illustrates the classification result of the hybrid classifier on training set data.
Figure 8B:
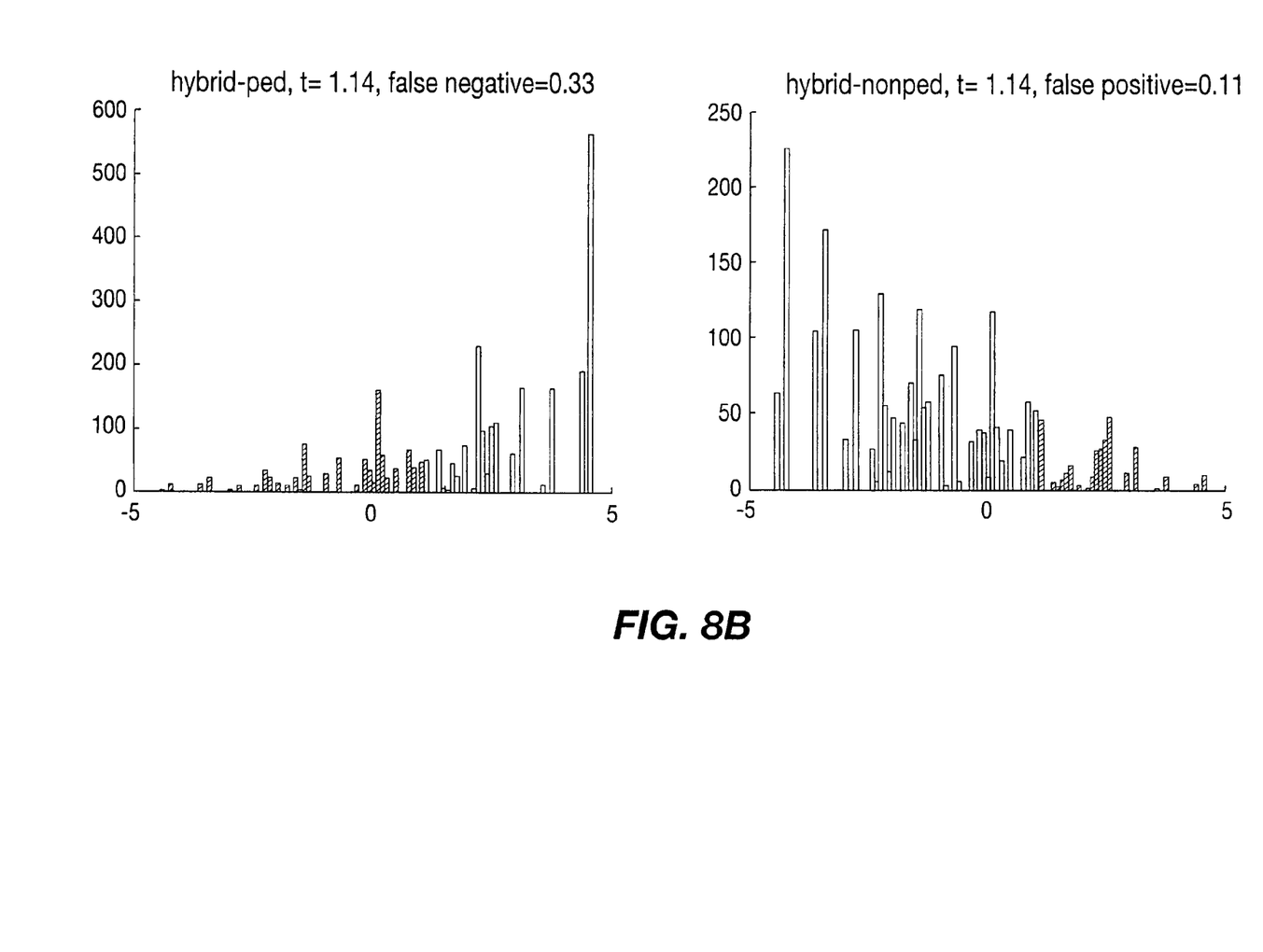
Figure 9:
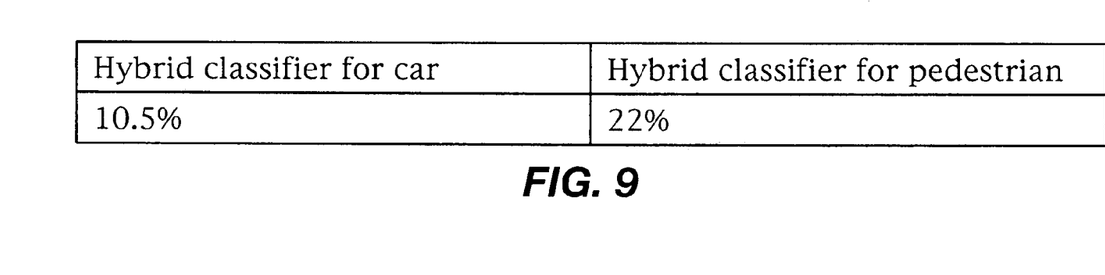
FIG. 9 illustrates the error rate of the hybrid classifiers using the training set data.

FIG. 8A-B shows the classification result of the hybrid classifier on training set data. The hybrid car classifier has comparable performance with the best performing individual classifier (edge ROI classifier), while the hybrid pedestrian classifier outperforms each individual classifier on the training set. The error rate of the hybrid classifiers on the training set is illustrated in FIG. 9.

As a standard practice, a portion of the whole data set is randomly selected and reserved as a testing set. After the parameters of the hybrid classifiers are learned from the training set, the performance of the hybrid classifiers is tested on the testing set.

Figure 10A:
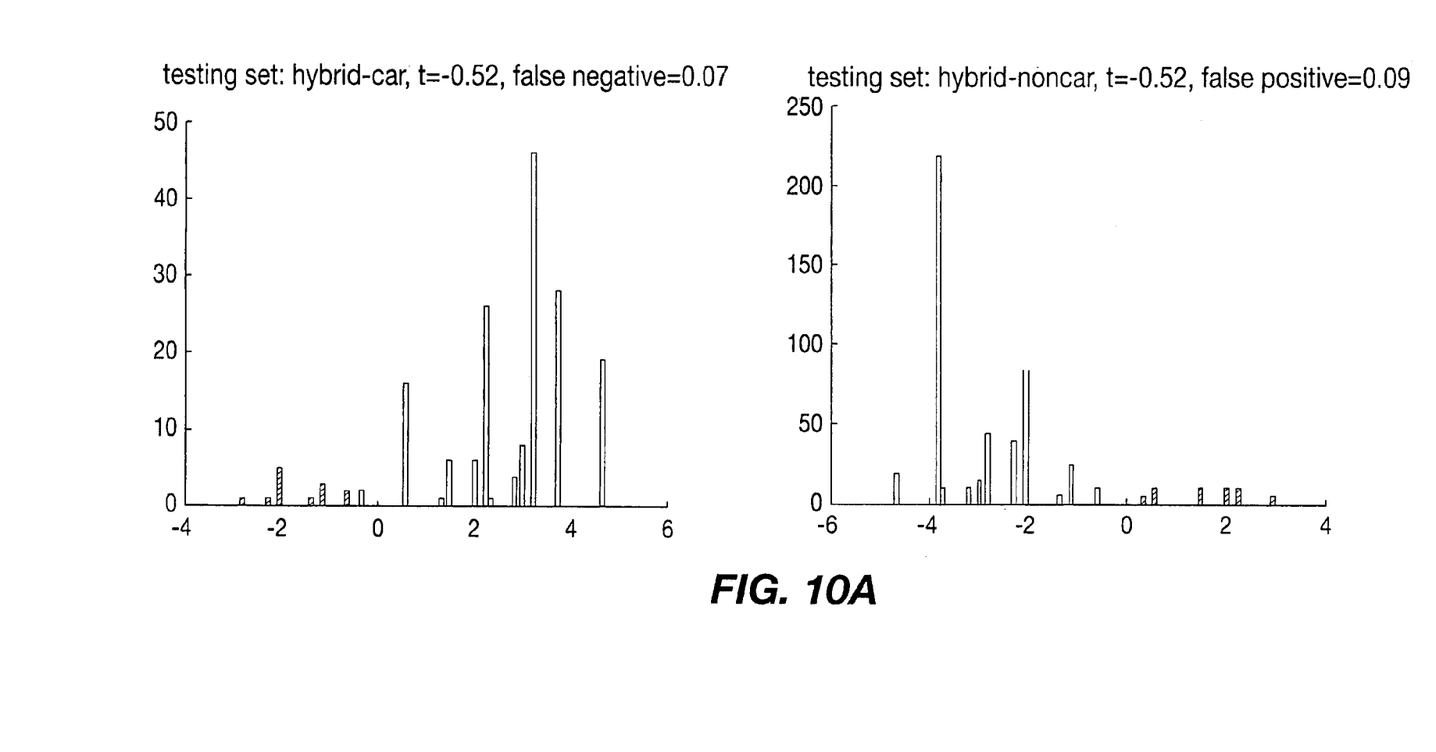
FIG. 10A-B illustrates the classification result of the hybrid classifier on the testing set.
Figure 10B:
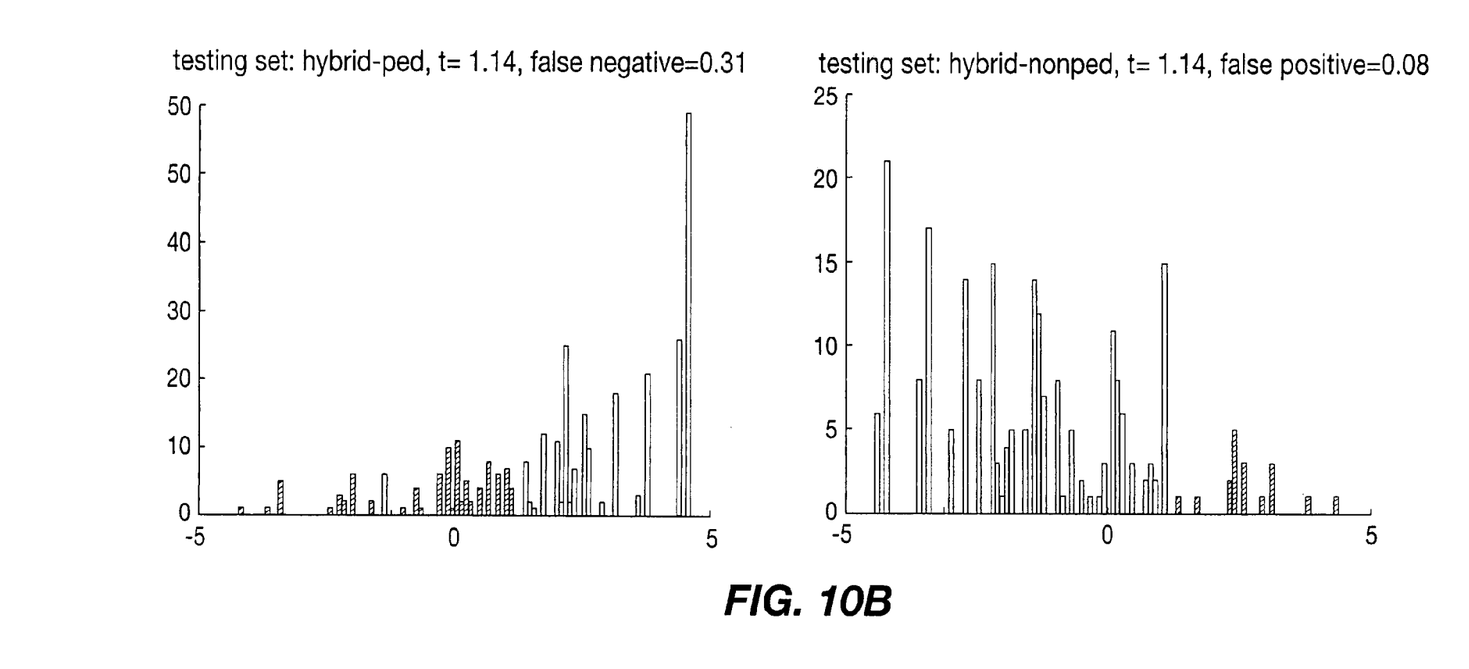
Figure 11:
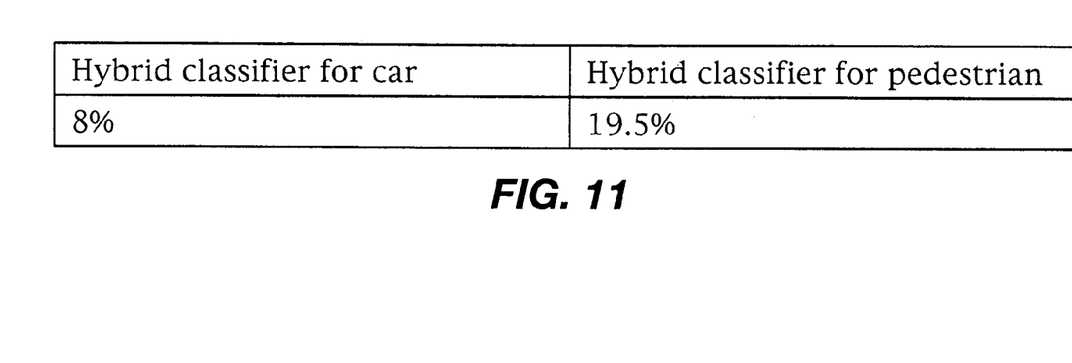
FIG. 11 illustrates the error rate of the hybrid classifiers on the testing set.

FIG. 10A-B shows the classification result of the hybrid classifier on the testing set. FIG. 11 shows the error rate of the hybrid classifiers on the testing set. The performance on the testing set has thus been found to be comparable to the performance on the training set, indicative of the robustness of this approach.

While the foregoing is directed to embodiments of the present invention, other and further embodiments of the invention may be devised without departing from the basic scope thereof, and the scope thereof is determined by the claims that follow.

The invention claimed is:

1. A method of classifying an object in an image, comprising:
    providing a plurality of sub-classifiers, the plurality of sub-classifiers comprising image-based classifiers and depth based classifiers, the image-based classifiers comprising one of a contour-based classifier and an edge-based classifier, the image-based classifiers identifying elements based on at least one image, the depth-based classifiers identifying elements based on depth relative to one of a sensor and at least one reference point, the contour-based classifiers identifying elements based on properties derived from significant intensity transitions of similar quality in an image along continuous long segments or curves, the edge-based classifiers identifying elements based on properties derived from significant intensity transitions of similar quality in an image along short, straight, continuous segments; and
    classifying the object using input from each of the plurality of sub-classifiers.

2. The method of claim 1, wherein said classifying comprises combining the plurality of sub-classifiers using a Bayesian approach.

3. The method of claim 1, wherein said classifying comprises combining the plurality of sub-classifiers using a hybrid classifier.

4. The method of claim 3, wherein said hybrid classifier defines hypotheses; and uses a likelihood ratio to decide which hypothesis to select.

5. The method of claim 4, wherein a classification decision is made according to:
    $H_0$ if $f_k > 0$
    $H_1$ otherwise
    where $H_0$ and $H_1$, are the hypotheses and $f_k$ is the likelihood ratio.

6. The method of claim 1, wherein the depth-based classifiers comprise measuring the peakness of a pedestrian model match.

7. The method of claim 6, wherein the peakness of a pedestrian model match is defined as the ratio of a first pedestrian 3D score and the sum of two pedestrian 3D scores that are adjacent to the first pedestrian 3D score.

8. The method of claim 1, wherein the depth-based classifiers comprise obtaining a ratio of a pedestrian 3D model score and a car 3D model score.

9. The method of claim 1, wherein the depth-based classifiers comprise an eccentricity test.

10. The method of claim 9, wherein the eccentricity test measures the flatness of a target in a depth map.

11. The method of claim 1, wherein the depth-based classifiers comprise one of a vehicle model three-dimensional block template matching score and a pedestrian model three-dimensional block template matching score.

12. An apparatus for classifying an object in an image, comprising:
  means for providing a plurality of sub-classifiers, the plurality of sub-classifiers comprising image-based classifiers and depth based classifiers, the image-based classifiers comprising one of a contour-based classifier and an edge-based classifier, the image-based classifiers identifying elements based on at least one image, the depth-based classifiers identifying elements based on depth relative to one of a sensor and at least one reference point, the contour-based classifiers identifying elements based on properties derived from significant intensity transitions of similar quality in an image along continuous long segments or curves, the edge-based classifiers identifying elements based on properties derived from significant intensity transitions of similar quality in an image along short, straight, continuous segments; and
  means for classifying the object using input from each of the plurality of sub-classifiers.

13. The apparatus of claim 12, wherein said classifying comprises combining the plurality of sub-classifiers using a Bayesian approach.

14. The apparatus of claim 12, wherein said classifying comprises combining the plurality of sub-classifiers using a hybrid classifier.

15. The apparatus of claim 14, wherein said hybrid classifier defines hypotheses; and uses a likelihood ratio to decide which hypothesis to select.

16. The apparatus of claim 15, wherein a classification decision is made according to:
  $H_0$ if $f_k > 0$
  $H_1$ otherwise
  where $H_0$ and $H_1$, are the hypotheses and $f_k$ is the likelihood ratio.

17. The apparatus of claim 12, wherein the depth-based classifiers comprise one of a vehicle model three-dimensional block template matching score and a pedestrian model three-dimensional block template matching score.

18. The apparatus of claim 12, wherein the depth-based classifiers comprise measuring the peakness of a pedestrian model match.

19. The apparatus of claim 18, wherein the peakness of a pedestrian model match is defined as the ratio of a first pedestrian 3D score and the sum of two pedestrian 3D scores that are adjacent to the first pedestrian 3D score.

20. The apparatus of claim 12, wherein the depth-based classifiers comprise obtaining a ratio of a pedestrian 3D model score and a car 3D model score.

21. The apparatus of claim 12, wherein the depth-based classifiers comprise an eccentricity test.

22. The apparatus of claim 21, wherein the eccentricity test measures the flatness of a target in a depth map.

23. A computer-readable medium having stored thereon a plurality of instructions, the plurality of instructions including instructions which, when executed by a processor, cause the processor to perform the steps of a method for classifying an object in an image, comprising:
  providing a plurality of sub-classifiers, the plurality of sub-classifiers comprising image-based classifiers and depth based classifiers, the image-based classifiers comprising one of a contour-based classifier and an edge-based classifier, the image-based classifiers identifying elements based on at least one image, the depth-based classifiers identifying elements based on depth relative to one of a sensor and at least one reference point, the contour-based classifiers identifying elements based on properties derived from significant intensity transitions of similar quality in an image along continuous long segments or curves, the edge-based classifiers identifying elements based on properties derived from significant intensity transitions of similar quality in an image along short, straight, continuous segments; and
  classifying the object using input from each of the plurality of sub-classifiers.

24. The computer-readable medium of claim 23, wherein said classifying comprises combining the plurality of sub-classifiers using a hybrid classifier.

25. The computer-readable medium of claim 24, wherein said hybrid classifier defines hypotheses; and uses a likelihood ratio to decide which hypothesis to select.

26. The computer-readable medium of claim 25, wherein a classification decision is made according to:
  $H_0$ if $f_k > 0$
  $H_1$ otherwise
  where $H_0$ and $H_1$, are the hypotheses and $f_k$ is the likelihood ratio.

27. The computer-readable medium of claim 23, wherein the depth-based classifiers comprise one of a vehicle model three-dimensional block template matching score and a pedestrian model three-dimensional block template matching score.

28. The computer-readable medium of claim 23, wherein said classifying comprises combining the plurality of sub-classifiers using a Bayesian approach.

29. The computer-readable medium of claim 23, wherein the depth-based classifiers comprise measuring the peakness of a pedestrian model match.

30. The computer-readable medium of claim 29, wherein the peakness of a pedestrian model match is defined as the ratio of a first pedestrian 3D score and the sum of two pedestrian 3D scores that are adjacent to the first pedestrian 3D score.

31. The computer-readable medium of claim 23, wherein the depth-based classifiers comprise obtaining a ratio of a pedestrian 3D model score and a car 3D model score.

32. The computer-readable medium of claim 23, wherein the depth-based classifiers comprise an eccentricity test.

33. The computer-readable medium of claim 32, wherein the eccentricity test measures the flatness of a target in a depth map.

* * * * *